Figure 1:
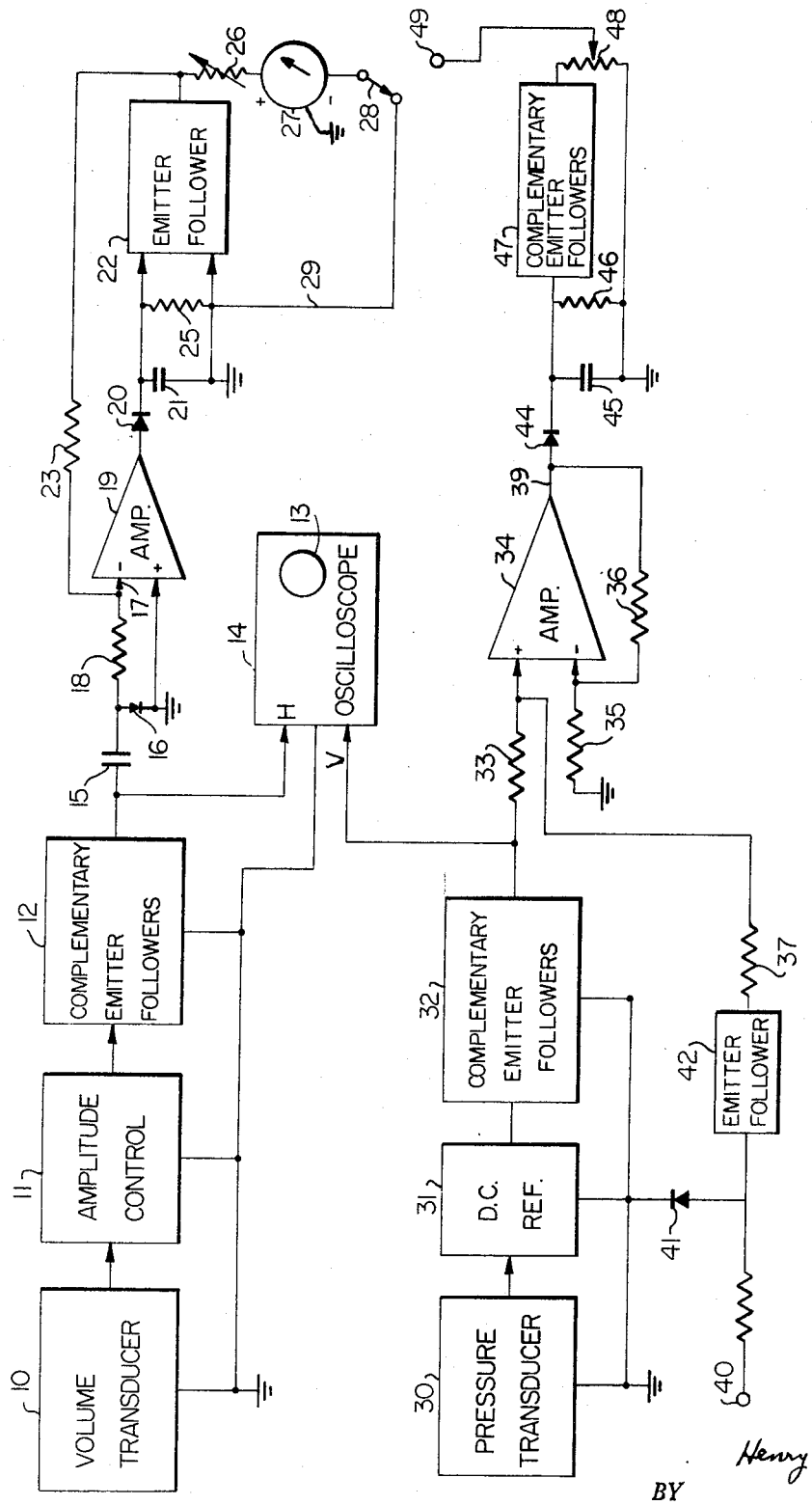

United States Patent

Guarino

[15] 3,677,092
[45] July 18, 1972

[54] VOLUME METERING APPARATUS FOR CIRCULATORY ASSIST PUMPS

[72] Inventor: Henry R. Guarino, Revere, Mass.

[73] Assignee: The United States of America as represented by the Secretary Department of Health, Education and Welfare

[22] Filed: June 17, 1970

[21] Appl. No.: 46,928

[52] U.S. Cl. ..............................73/432 A, 73/194 E, 73/269, 417/63
[51] Int. Cl. .........................................................G01d 5/14
[58] Field of Search..............73/432 R, 194 E, 262 R, 262 A, 73/263, 269; 417/63

[56] References Cited

UNITED STATES PATENTS

| | | |
|---|---|---|
| 2,483,924 | 10/1949 | Moulinier..............................417/63 |
| 3,456,444 | 7/1969 | Rishton..................................60/62.5 |
| 3,536,451 | 10/1970 | Ludwin....................................417/63 |

*Primary Examiner*—S. Clement Swisher
*Attorney*—Browdy and Neimark

[57] ABSTRACT

An electronic transient pulse operated volume metering circuit is disclosed which produces a visually readable volume indication derived from signals representative of the stroke of a blood pump in a circulatory assist system. Provisions are made for correcting the volume indication as a function of instantaneous pressure samples such as encountered in the patients circulatory system, and for visually presenting the relationship between the volume and pressure.

4 Claims, 2 Drawing Figures

VOLUME METERING APPARATUS FOR CIRCULATORY ASSIST PUMPS

This invention relates to volume metering apparatus and more particularly, it relates to electronic indicating instruments responsive to transient or instantaneous volume readings afforded as a function of stroke lengths in circulatory assist blood pump systems.

Instrumentation such as that used for indicating condition of the circulatory system of patients undergoing heart surgery, for example, as described in the U.S. Pat. No. 3,456,444 issued to Michael L. Rishton, July 22, 1969, may have therein a movable member representative of the stroke of the pump and, therefore, may be used as a function of the volume. The movement provides a function of the volume of pumped fluid that may be converted by intermediate electronic instrumentation into a visual indication of the maximum stroke or volume. However, several problems exist in such a conversion, and the sensed volume taken from the stroke transducer may not accurately represent actual volume of pumped blood.

Typically, a stroke member of a blood pump operates periodically in a transient or instantaneous pulsating manner which is synchronized with a patient's heart. This requires special treatment to obtain a current and accurate visual meter reading that is meaningful to an observer. The stroke of such a pump must operate under various types of conditions such as at different pressures relating to the pressure of the patient. The system itself may transform pressures at different points in a circulatory system to differing values or may introduce different non-linear operations. Particularly when expandible or elastic members are in the system which is deformed under pressure, the volume may not be a linear function of the stroke of a movable member sensed for indicating the volume. Since the system containing elastic elements effectively pumps against the existing pressures encountered in the patient's circulatory system, the indicated stroke volume must be corrected as a function of this back pressure so as to obtain an accurate indication of true pumped volume.

Accordingly, it is an object of this invention to provide electronic volume metering apparatus operable under conditions encountered in circulatory assist blood pump systems.

Another object of the invention is to provide volume metering apparatus which is responsive to transient periodic signals.

A further object of the invention is to provide volume metering apparatus operable to indicate volume from sensing periodic signals including means for correcting the indicated volume as a function of other parameters encountered in a circulatory system.

Thus, in accordance with the invention, there is provided an electronic link operating from a stroke transducer to produce a volume reading. The electronic link processes a series of periodic waveforms to convert stroke impulses into continuously presented stroke indications on a visually observable volume indication meter. Provisions are made to selectively correct the stroke volume readings as a function of pressure variations such as might be taken from a patient's circulatory system at particular instantaneous points of a pumping cycle.

Figure 2:
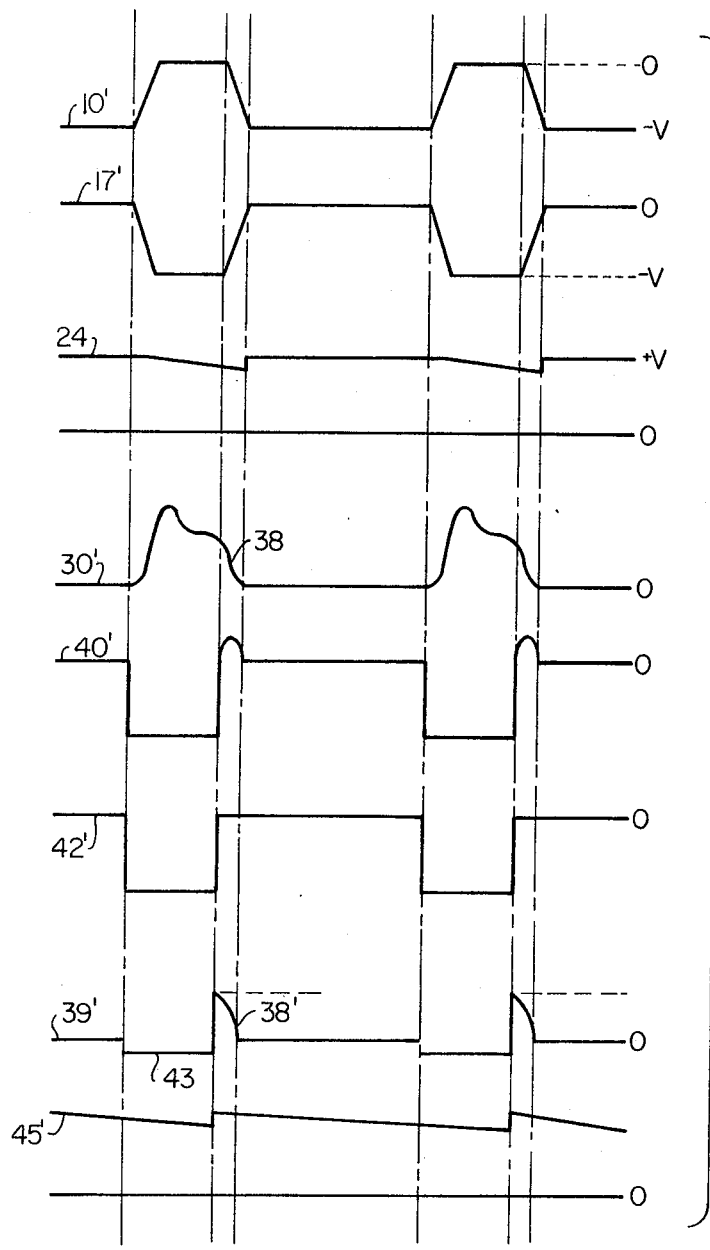

The invention, together with further object, features and advantages, is described in more detail with reference to a particular embodiment illustrated in the accompanying drawings, in which:

FIG. 1 is a block schematic circuit diagram of electronic volume metering apparatus afforded by the invention, and FIG. 2 is a waveform chart showing the relationship of typical transient pulsating signals encountered in the volume metering apparatus.

As may be seen in FIG. 1, a stroke of the pump may be sensed by volume transducer 10 in terms of a periodic varying level d-c waveform 10' as represented in FIG. 2. Each waveform in FIG. 2 is identified by a reference character related to the corresponding circuit position in FIG. 1, and, hereinafter, both figures are referred to simultaneously. Each of the circuits shown in block form is conventional at this state of the art and needs not, therefore, be shown in greater detail. This waveform is indicative of stroke volume and may be derived from apparatus as described in the aforementioned patent, for example, such as a linear transducer sensing the stroke of the pump.

Provision is made for amplitude control in block 11 and the waveform 10' is reproduced at the output of a complementary emitter follower translation circuit 12, where it is reproduced on sweep axis (H) of the oscilloscope 14. Capacitor 15 passes the signal waveform which is clamped to ground by diode 16 to form a negative going signal 17' connected by resistor 18 to minus input terminal 17 of a high gain operational amplifier 19.

The inverted amplified signal from amplifier 19 is connected through diode 20 to capacitor 21, which is charged to a peak voltage level higher than the peak voltage of the input pulse waveform 10'. Emitter follower circuit 22 feeds back a signal through feedback resistor 23 to the minus input terminal of operational amplifier 19. Resistors 18 and 23 are equal in resistance so that the d-c output voltage 24 will follow the peak voltage 10' linearly.

Resistor 25 and capacitor 21 have a time constant such that at fifty pulses per minute the ripple voltage on capacitor 21 is approximately 3 percent. This d-c voltage is passed through resistor 26 to the plus side of meter 27 which operates as a visual volume or stroke indicating means. When switch 28 is connected to the ground lead 29, the total uncorrected stroke volume is read. The plus input of operational amplifier 19 is grounded at lead 29.

For correcting the volume indication as an appropriate function of pressure, a pressure within the circulatory system of a patient transducer circuit 30 is provided which produces a corresponding pulse waveform 30', which may represent, for example, the blood pressure of a patient. The pressure waveform may be referenced to a d-c potential in circuit 31, which for example may clamp the waveform to ground or zero potential. Complementary emitter followers 32 connect pulse signal waveform 30' through resistor 33 to the plus input of operational amplifier 34. Also the pulse signal waveform is coupled to another deflection axis (V) of oscilloscope 14 to reproduce on screen 13 a relative wave diagram relating the pressure waveform 30' with the stroke waveform 10'. The oscilloscope is synchronized with the patient's heartbeat. The resulting oscilloscope display pattern is similar to a magnetic hysteresis loop and represents the work done by the pump.

The output of this operational amplifier 34 is the sum of the two input signals ( + and − ) times a small amount of gain. Resistors 33 and 35 are, thus, equal in value and resistors 36 and 37 are typically 2.4 times the resistance of resistors 33 and 35.

Only the trailing edge portion 38 of the pressure pulse waveform 30' must appear at the amplifier output terminal 39 to produce output waveform 39'. This trailing edge portion 38, occurs at a time when the blood pump is not pumping but is returning to rest as indicated by the downwardly sloped portion of curve 10'. Thus, trailing edge portion 38 represents actual blood pressure of the patient as it exists without interference or assist by the blood pump. Accordingly, a pulse drive signal 40' is presented at input terminal 40 to produce, after clamping by diode 41, the waveform 42' passed by emitter follower circuit 42. The peak amplitude of this waveform is higher than and opposite in phase to the pressure pulse 30' in order to produce the output signal waveform 39' which has a negative pulse 43 followed by the desired positive signal 38' derived from the trailing edge 38 of the pressure pulses of waveform 30', as the input waveforms to the operational amplifier 34 add the two waveforms 30' and 42'.

Rectifier diode 44 passes only the positive signal to charge capacitor 45 as represented by waveform 45'. The time constant of capacitor 45 and resistor 46 is several seconds, resulting in a modest ripple voltage of 2 percent at a charging rate of 50 times a minute. Thus, the d-c level 45' is representative of the peak amplitude of the positive signal 38' of waveform 39'.

Complementary emitter followers pass waveform 45' to the variable resistor 48 which takes a portion of this corrective waveform to cancel out the corresponding volume or stroke reading on meter 27 when switch 28 is in the corrective position at terminal 49. In this way, a dead volume reading may be cancelled out.

What is claimed is:

1. Volume indicating apparatus for visually displaying from periodically recurring pulse signals of varying peak level indicative of volume such as provided from the stroke of a blood pump operating in a circulatory assist system comprising in combination, an operational amplifier providing an amplitude gain, means clamping said pulse signals, first resistor means applying the clamped pulse signals to one input terminal of said operational amplifier, rectification means coupled to the output terminal of said operational amplifier, a capacitor receiving the amplified pulse signals from said amplifier through said rectification means to store a peak value thereof, feedback resistor means of the same value as said first resistor means coupling said amplified signals from said capacitor back to said one input terminal of the operational amplifier, metering means indicating the peak level at said capacitor to produce a volume reading, and time constant resistive means coupled to said capacitor to retain said peak value reasonably constant over the repetition frequency of said recurring pulse signals.

2. Apparatus as defined in claim 1 including means responsive to periodic pressure pulses producing a corrective d-c signal, and means coupling the corrective d-c signal to adjust the indication on said metering means.

3. Apparatus as defined in claim 2 wherein the means responsive to periodic pressure pulses comprises an operational amplifier and means providing a pressure pulse waveform to one input terminal and a reference pulse waveform of lesser duration and greater amplitude than the pressure pulse waveform and of opposite phase to thereby produce at the output of the operational amplifier a corrective signal representative of a predetermined portion of the pressure pulse waveform.

4. Apparatus as defined in claim 1 including oscilloscope means having the stroke pulse signals coupled to one deflection axis, and means presenting periodically occurring pressure pulses to another deflection axis to thereby generate a visual trace showing the relationship between stroke and pressure.

* * * * *